United States Patent [19]

Gibson, Jr. et al.

[11] 4,167,821
[45] Sep. 18, 1979

[54] PROGRAMMABLE SIMULATED TRAINER

[75] Inventors: Herman B. Gibson, Jr.; George L. Frye, Jr., both of Orlando, Fla.

[73] Assignee: Educational Computer Corp., Strafford, Pa.

[21] Appl. No.: 773,595

[22] Filed: Mar. 2, 1977

[51] Int. Cl.² .............................................. G09B 23/00
[52] U.S. Cl. ........................................ 35/10; 35/9 A; 35/13
[58] Field of Search .................... 35/5, 6, 8 R, 10, 13, 35/9 R, 9 A, 9 B, 48 R; 340/324 A, 324 AD; 364/200 MS File, 900 MS File

[56] References Cited

U.S. PATENT DOCUMENTS

| | | | |
|---|---|---|---|
| 3,166,856 | 1/1965 | Uttal | 35/6 |
| 3,310,883 | 3/1967 | Young | 35/10 |
| 3,573,792 | 4/1971 | Reed | 40/132 D X |
| 3,584,401 | 6/1971 | Cryer et al. | 40/132 D X |
| 3,623,157 | 11/1971 | Stapleford | 35/9 A X |
| 3,832,790 | 9/1974 | Fryer et al. | 35/9 A X |
| 3,874,669 | 4/1975 | Ariano et al. | 340/324 A X |
| 3,924,339 | 12/1975 | Wilson et al. | 35/9 A X |
| 3,973,244 | 8/1976 | Lovercheck et al. | 364/200 |
| 3,974,482 | 8/1976 | Balashov et al. | 35/8 R |
| 3,981,087 | 9/1976 | Sachs | 35/22 R X |

OTHER PUBLICATIONS

Technical Bulletin; "Model S-50 Graphic CRT Display System"; Honeywell Marine Systems Center; 1971.

Primary Examiner—Vance Y. Hum

[57] ABSTRACT

A computer based trainer employing a microprocessor connected to a program memory and input and output devices by means of common address and data buses. The input devices include a plurality of student operable switches, associated with a pictorial presentation of the lesson subject, which are interconnected in a switch matrix whereby the state of the individual switches may be sensed by energizing columns and sensing rows of the matrix under control of a stored program. The teaching machine also utilizes a non-volatile memory in which at least a portion of the program is stored.

23 Claims, 4 Drawing Figures

PROGRAMMABLE SIMULATED TRAINER

BACKGROUND OF THE INVENTION

(1) Field of the Invention

The present invention relates to teaching machines and particularly to trainers which present problems to and require active responses from the student. More specifically, this invention is directed to the simulation of problems and to the measurement of student reaction to such simulated problems. Accordingly, the general objects of the present invention are to provide novel and improved apparatus and methods of such character.

(2) Description of the Prior Art

Teaching machines or trainers are, of course, now well known in the art. In evolution, teaching machines have progressed from "hardwired" simulators which lack the capability of presenting multiple lesson subjects without difficult and expensive rewiring, as exemplified by the trainer of U.S. Pat. No. 3,310,883, to computer based systems, as exemplified by U.S. Pat. No. 3,832,790. The computer based trainer has the attribute of being adaptable, through the expedient of reprogramming a memory, to present a plurality of different lesson subjects. The prior art hardwired and programmable teaching machines all approach the problem of lesson simulation through definition of a set of system output variables and a set of system input variables that describe the attributes of the subject of the lesson which may, for example, be a piece of equipment which is to be simulated. A set of conditions, or in the case of apparatus a set of malfunctions related thereto, related to the input/output variables is also defined. Finally, the output variables, the input variables and the conditions or malfunctions are related to each other in the form of a Boolean model.

As noted above, the implementation of the logical Boolean relationship between output variables, input variables and conditions has employed various types of hardware and techniques. Prior hardwired trainers have employed relay-type logic and have been expensive to fabricate, troubleshoot and maintain. Prior computer based or programmable teaching machines have also been comparatively expensive. Thus, there has been a desire in the prior art for a trainer which, while of the fixed program type, takes advantage of the most recent advances in solid state electronics technology and thereby has the reliability attributes of the previous programmable trainers while simultaneously being less costly than both the previously available hardwired and computer based teaching machines.

SUMMARY OF THE INVENTION

The present invention overcomes the above discussed and other deficiencies and disadvantages of the prior art through use of a solid state microprocessor and, in a preferred embodiment, a read only program memory to establish the interrelationship of the Boolean model of each specific lesson subject with the input/output variables commensurate with the lesson subject. A teaching machine in accordance with the present invention includes, in addition to the microprocessor and program memory, a "scratch pad" memory and various input and output devices and circuits. The program memory is the "non-destructive" memory that contains the instructions which control the microprocessor whereby student inputs may be evaluated and appropriate outputs generated commensurate with the student inputs and the instantaneous state of the lesson subject. The "scratch pad" memory is a random access memory which is utilized to store intermediate results of calculations or operations prior to analysis thereof by the microprocessor. The input devices consist of switches and potentiometers, and associated circuitry, which generate discrete bit inputs as a consequence of active student responses to the lesson subject as simulated pursuant to the stored program. Similarly, the output circuits include various display devices which are energized, under the control of the microprocessor and pursuant to the stored program, to simulate problems for the student to solve and to also provide a visual indication to the student of the results of his answer or response to each simulated problem. The input and output devices and circuits are, in part, associated with a display panel which will typically bear a pictorial, albeit schematic, representation of the lesson subject. In the situation where a piece of equipment is being simulated, the display panel may include a representation of the equipment with switches, simulated gauges or meters and lamps being associated with test points normally provided on the equipment.

In accordance with a preferred embodiment of the invention, data is moved in and out of the microprocessor on a bidirectional data bus common to all subsystems within the teaching machine. Similarly, a common address bus enables the microprocessor to directly address memory locations in the read only memory and the "scratch pad" memory and to address storage devices included in the input and output circuits. Thus, all data is exchanged on a common bus and data entering or leaving the microprocessor will be identified by the presence of either a READ or WRITE command as generated by the microprocessor. The input devices will include an array of student operable switches which are scanned during evaluation of the student's response to a presented problem. The switches are interconnected in a matrix and are scanned by activating columns in matrix under the command of the microprocessor and monitoring rows of the switch matrix.

The teaching machine of the invention is additionally provided with block select logic circuitry, defined by a "programmable" read only memory, which is tied to the address bus. The block select circuit defines the location of particular input and output subsystems thereby enhancing the speed of operation of the trainer and reducing cost by simplifying the logic required.

The trainer of the present invention is further characterized by provision of a real time clock which, in response to an input from the block select circuit and a "read" command from the microprocessor, will apply a word to the address bus indicative of elapsed time. This timing information is employed to update an elapsed time indicator, thus permitting an evaluation of the student's response time to solve a problem. The real time clock may also be employed whenever time is an element of an equation, relative to the particular simulation model being solved such as, for example, when a time delay or sequential operation is to be simulated.

BRIEF DESCRIPTION OF THE DRAWING

The present invention may be better understood, and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
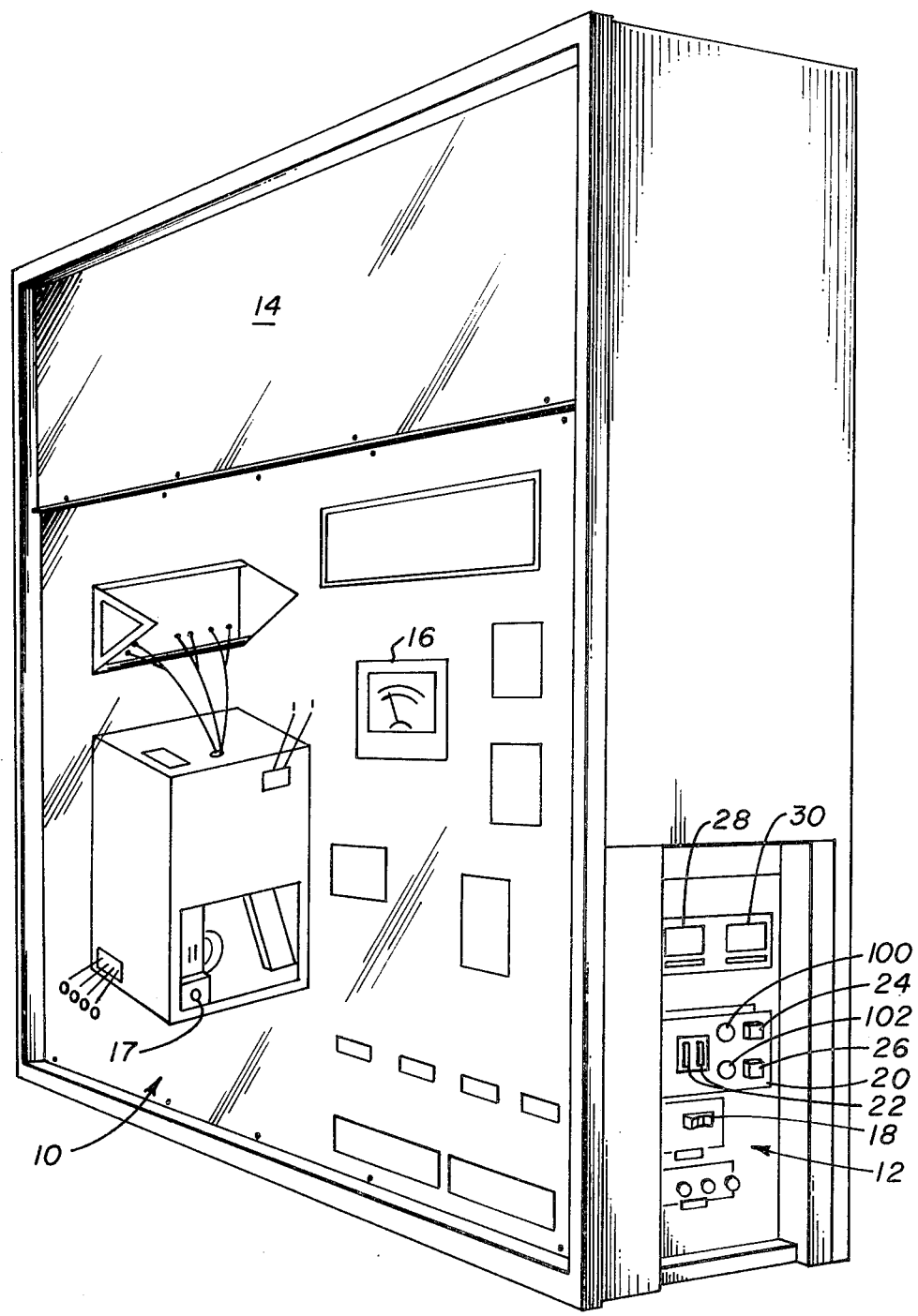
FIG. 1 is a perspective view of a teaching machine in accordance with the present invention.

With reference now to FIG. 1, a teaching machine in accordance with the present invention is shown in perspective. The teaching machine, which in operation may be placed on a table, includes a frame which supports a student panel indicated generally at 10, a control panel 12 and a display panel 14. The bottom, top, sides and back of the frame will typically be covered with a suitable medium and all of the electronics, including power supplies, required to implement the lesson simulation will be located within the bounds of the frame.

The student panel 10 covers the major portion of the front of the trainer and is the focal point of the lesson. Considering the situation where the student is to be taught troubleshooting and servicing procedures for a particular piece of equipment, panel 10 will bear a pictorial schematic model of the equipment. During the lesson the student will "operate" the display panel; i.e., the simulation model; in substantially the same way as he would the actual equipment being simulated. Student panel 10, in addition to the pictorial presentation, includes a plurality of controls and indicators including a meter or meters, such as meter 16, which may function as simulated gauges. Panel 10 also supports push button type switches, such as switches 17, associated with elements of the equipment being simulated. Test points for probes and lamps are also typically found on panel 10. The controls and indicators are graphically associated with portions of the pictorial schematic of the equipment whereby, for example, the student may depress buttons indicating that he has performed a test on particular components of the equipment being simulated. A "replace/repair" button and a "test" button will typically also be provided on panel 10 so as to permit the student, by coordinated operation of either of these additional buttons with an element associated button, to simulate the replacement or testing of a component. Operation of an element associated button with the "test" button will typically result in the presentation of technical information as, for example, by projecting a visual on display panel 14. As will be described below in the discussion of FIG. 4, in the preferred embodiment the student panel may include a plurality of meters or simulated gauges. The student's reaction to "normal" simulated equipment status and to any of a plurality of simulated malfunctions may be caused to drive the needle on the meter or meters, for example meter 16, to any position on the scale or to pin the needle.

The control panel 12 is, in the disclosed embodiment, located on one end of the trainer and includes several indicators and controls. The controls include a main power switch 18 and a "system condition" selector 20. The system condition selector 20 includes a pair of thumb wheel type switches 22 which permit an instructor to select any one of 99 problems for presentation to the student. The "system condition" selector also includes a problem "insert" push button type switch 24 and a "clear" switch 26. In the disclosed embodiment, a pair of indicators 28 and 30 are provided for respectively indicating elapsed time and the number of corrective procedures or "repair/replacement" operations and/or tests "performed" by the student. The elapsed time indicator 28 records the total time, usually starting with the insertion of the problem, until the student presses the button associated with the proper switch on panel 10 to solve the problem. The "replace/repair" indicator 30 records each activation of the "repair/replace" button on panel 10 and may also record the number of simulated test procedures performed by the student. Both of indicators 28 and 30 are resettable to zero.

The trainer of the present invention will also usually, but not necessarily, include the display panel 14 located directly above the student panel 10. In the disclosed embodiment the display section is of the back lighted type and includes a "dead face" plastic screen which covers a plurality of transparencies; the area immediately behind the plastic screen being of a modular or egg crate structure thus enabling the selection of individual transparencies for illumination and display. An individual lamp is associated with each area of the modular structure and energization of individual lamps is under the control of the circuitry of FIG. 2. It will be understood that the back lighted type display can, if deemed necessary or desirable, be replaced or supplemented by a slide projector with random access capabilities such as, for example, the projector disclosed in U.S. Pat. No. 3,865,479.

Figure 2:
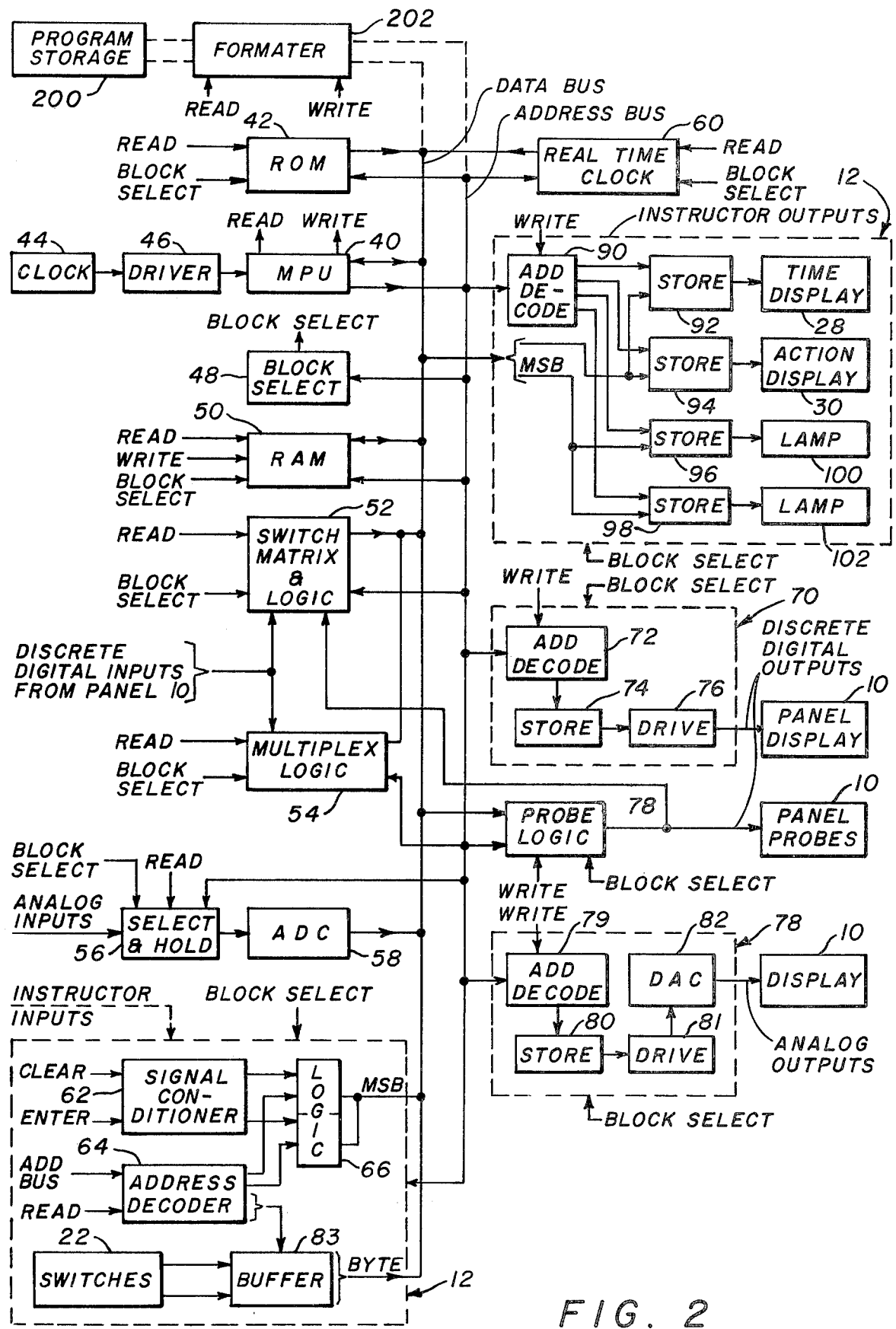
FIG. 2 is a functional block diagram of the teaching machine of FIG. 1.

Referring to FIG. 2, a trainer in accordance with the preferred embodiment of the present invention is depicted in functional block diagram form. The trainer employs, as its principal electronic component, a solid state microprocessor 40. The microprocessor 40 may be any one of a number of commercially available devices such as an Intel Model 8080 or a Motorola Type 8600. The trainer is characterized by a bidirectional data bus on which all data moves in and out of microprocessor 40. In addition, the trainer employs a common address bus whereby the microprocessor 40 may directly address locations in a "program" memory 42. As is common in the art, the microprocessor 40 is associated with a clock 44 with the clock inputs being delivered to the microprocessor by a conventional clock driver 46. Microprocessor 40 is a single integrated circuit which is capable of recognizing over 70 commands including accumulator and memory instructions, index register and stack manipulation instructions, jump and branch instructions and conditional code register manipulation instructions. The microprocessor 40 will typically have a cycle time of 2 microseconds.

The trainer also includes block select logic circuitry 48, defined by a read only memory with a fixed program, and a random access memory 50 which functions as a "scratch pad" memory. The trainer will receive discrete digital inputs from the student panel 10 and may also receive analog input signals commensurate with student responses to simulated problems. The discrete digital inputs are generated by student produced switch closures resulting from actuation of the panel buttons 17. The switches associated with the panel mounted buttons are interconnected in a matrix 52; the switch matrix 52 having logic circuitry associated therewith as will be discussed below in the description of FIG. 3. Additionally, discrete individually selectable digital inputs from the panel 10, also in the form of switch closures, may be available. If available, these additional inputs are applied to a multiplex logic circuit 54. Multiplex logic circuit 54 routes one out of forty-eight inputs to the data bus in response to addressing and block select signals. Multiplex logic circuit 54 may be a multiplexer such as a type CMOS 34051 available from Fairchild Electronics.

The panel analog inputs, if employed, will typically be generated by student manipulation of potentiometers. These analog inputs are applied to a select and hold circuit 56 and, in response to a "read" command signal generated by microprocessor 40, the analog inputs are delivered to the data bus via analog-to-digital conversion circuitry 58.

The other inputs to the trainer logic circuitry are generated from the control console 12 and by a real time clock 60. The control console 12 inputs, as described above, include the "condition selection" switches 22 and the enter and clear switches 24 and 26. The control console 12, which will be discussed in somewhat more detail below, also includes an address decoder 64, signal conditioning circuitry 62 and logic circuitry 66.

As noted above, all data moves in and out of the microprocessor 40 on the bidirectional data bus. Thus, in addition to the microprocessor, the read only memory 42, the random access memory 50, the selected discrete digital inputs provided by student action and student generated inputs from switch matrix 52, the converted student generated analog inputs from circuit 58, the instructor generated inputs from control panel 12 and the output of real time clock 60 are all coupled to the data bus. Data may flow in either direction from microprocessor 40 and the "scratch pad" memory 50 to the data bus and from the read only memory 42, clock 60 and the various input information generating devices to the data bus.

The microprocessor 40 supplies an address number to the 16 line address bus in response to the sequence of commands comprising the program stored in memory 42. When the block select logic circuit 48 recognizes a number on the address bus it generates an output which selects appropriate circuitry and applies an enabling signal thereto. Memories 42 and 50 are connected to the address bus and also receive block select enabling signals. The address bus is also connected to the real time clock 60 and the various input and output circuits. The outputs include the indicators 28 and 30 on the control panel 12, the discrete digital outputs which energize lamps and/or probes associated with the pictorial schematic on panel 10 and, in some cases, an analog display. The display lamps will include those lamps associated with the display panel 14 of the trainer.

The discrete digital outputs, as noted above, include the lamps associated with the student panel 10 and display panel 14. The digital outputs also include one or more meter drives, which are included as part of the panel display of FIG. 2, and various probes which may be associated with the student panel 10. The lamp energization and meter drive circuitry is indicated at 70 and includes an address decoder 72, storage capability 74 and drivers 76. The meter drive circuitry will be discussed below in the description of FIG. 4. The panel probes are energized via probe logic circuitry 78 which is connected to receive inputs from both the data and address buses.

The analog outputs, if present, include control circuitry 78 which incorporates an address decoder 79, storage device or devices 80, driver amplifiers 81 and digital to analog converters 82.

In operation, continuing to consider the example where the teaching machine of the present invention is employed to train service technicians, the simulated system may initially be called upon to function normally and provide the student with indications commensurate with the piece of equipment being simulated operating with no malfunctions or other problems. Simulated tests may be conducted on the normally functioning simulation to obtain visual indications of normal voltages, pressures, etc. In accordance with a lesson, the microprocessor 40 will respond to inputs from the condition entry switches 22 to modify the operating characteristics of the simulated system pursuant to the program stored in memory 42; the "abnormal condition" output, commensurate with the problem selected through manipulation of switches 22, provided to the data bus from control panel 12 being in the form of a byte. The problem is entered by momentarily closing the problem insert switch 24 on the control panel 12 whereupon information commensurate with the selected abnormality or problem will be loaded into the "scratch pad" memory 50. Entry of a problem will cause the energization of a lamp 100 associated with the problem insert switch and this lamp will automatically be extinguished when the student takes the appropriate corrective action. Once modified by the entry of a problem, the trainer continues to operate as a system with the problem identified by the input corresponding to the positioning of switches 22 until a proper corrective action, in the form of student operation of one or more component associated buttons and the "replace/repair" button on panel 10, has been taken.

During operation with a problem entered or with a normal simulation, the memory 42 will receive addressing inputs from microprocessor 40 and block select enabling signals from block select circuit 48. Microprocessor 40 will, serially and pursuant to the stored program, generate "read" and "write" commands. Upon receipt of a "read" command from the microprocessor and a "block select" signal, memory 42 will, upon addressing, deliver the next instruction in its program to microprocessor 40. The "read" commands from microprocessor 40 are delivered to the "scratch pad" memory 50, switch matrix 52 associated with student panel 10, the multiplex logic 54 also associated with panel 10, the select and hold circuitry 56 associated with the analog inputs, the real time clock 60 and the control panel 12 in addition to being delivered to memory 42. The "write" command signals will be delivered to the "scratch pad" memory 50 and to the various output subsystems including instructor outputs, the discrete digital outputs and the analog outputs.

To briefly review operation of the trainer, the logic equations commensurate with the system being simulated are stored in memory 42; i.e., memory 42 contains the instructions which control microprocessor 40. Memory 42 provides, via the data bus, information which tells microprocessor 40 how to evaluate the digital and analog inputs generated by the student in relationship to the simulated system conditions which may include a malfunction entered by the instructor. Memory 42, in conjunction with the contents of the "scratch pad" memory 50, also determines the appropriate outputs, in terms of meter readings, lamp energizations, etc., that would occur for the device being simulated. Digital signals commensurate with these outputs are delivered via the data bus, under the control of the "block select", "write" and "address" signals, to the digital and analog output circuits associated with the display devices on the student panel 10 including the visual display panel 14. In a preferred embodiment, memory 42 is a MOS-type programmable semiconductor memory which provides non-volatile storage. As an alternative, as depicted in FIG. 2, memory 42 may provide the firmware necessary for implementing an interface between a variable program model as may be delivered to a "scratch pad" memory 50 from a program storage medium 200 via a formatter 202. In such case the fixed program in memory 42 will compliment the total system concept to thereby reduce the programming effort.

The random access or "scratch pad" memory 50 is also preferably a semiconductor MOS-type memory. In the disclosed embodiment, memory 50 stores the intermediate results of calculations or operations being performed by microprocessor 40. The "read" and "write" signals from microprocessor 40 are delivered as inputs to memory 50 to define the direction of data travel and the "scratch pad" memory is also connected to the block select circuit 48 thereby insuring that memory 50 is enabled only when program memory 42 is not enabled. As previously noted, the random access "scratch pad" memory 50 receives data from the data bus, including the inputs generated from the control panel 12, and delivers data to the data bus. Memory 50 is also connected to the address bus.

Student inputs, after any conditioning which may be required, are applied to the data bus and will be interpreted by the microprocessor 40, under control of memory 42 and/or memory 50, to produce signals representing the simulated system response. The input circuits; i.e., circuits 52, 54, 56 and 58; are semiconductor circuits which condition the discrete and analog inputs to be compatible with the data bus. Discrete bit inputs, such as the state of the contacts of a switch operated by a push button on the student panel 10, are determined by selection of that switch under program control via the address bus and the testing of its state; i.e., either on or off. The manner in which the condition of the student panel switches are scanned will be explained in more detail below in the discussion of FIG. 3.

Figure 4:
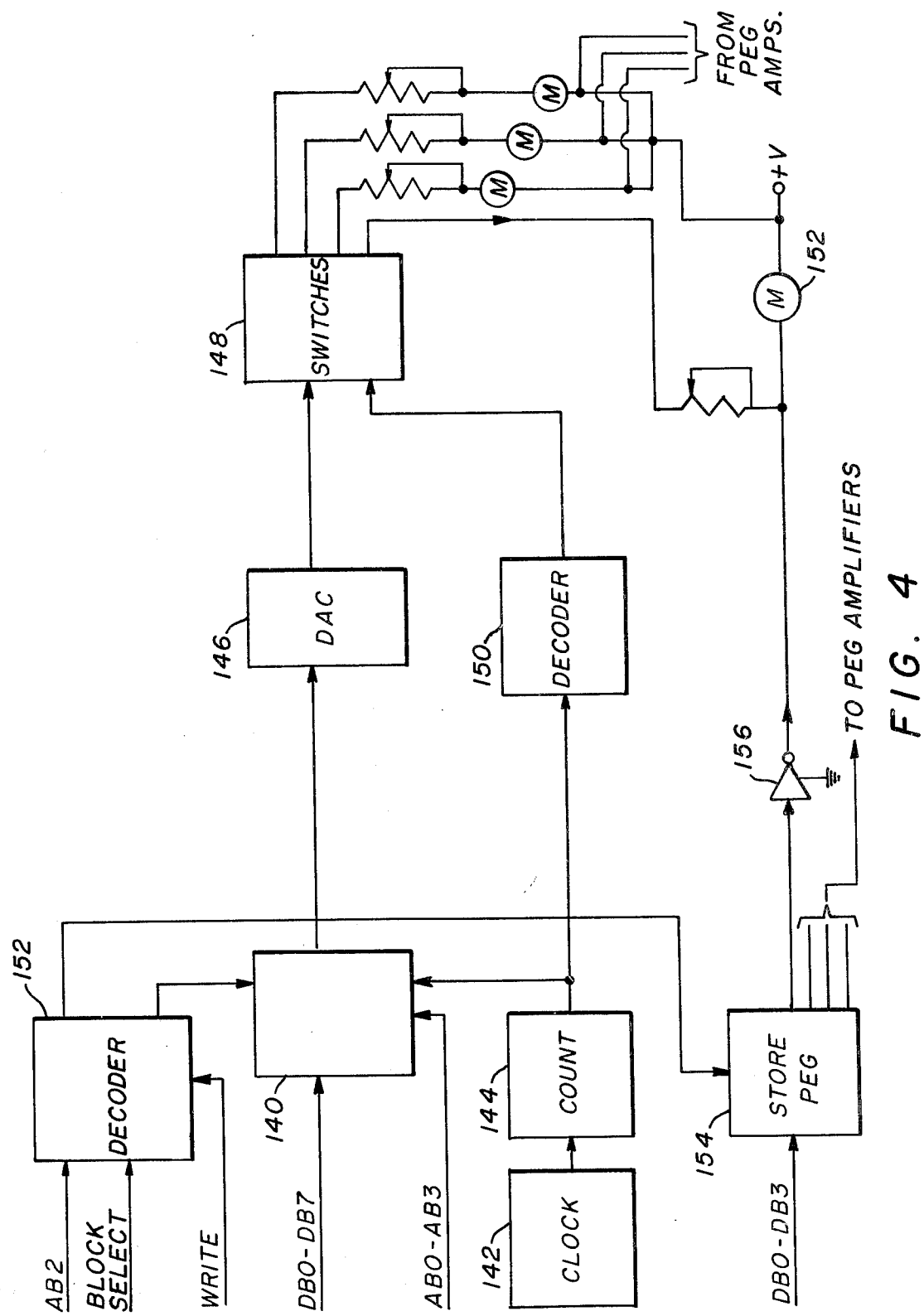
FIG. 4 is a block diagram of meter drive output circuitry which may be utilized in the embodiment of the invention depicted in FIGS. 1 and 2.

The output signals representing the simulated system response to a student input are, after conditioning as necessary, applied to the appropriate output device. The output circuits, and particularly the circuits represented at 70 in FIG. 2, are semiconductor circuits which condition the signals from the data bus to drive the required outputs. Signals destined for lamps, indicators and solenoids will be applied, in the manner known in the art, to buffers for power amplification and isolation. While the trainer may generate and utilize output information in analog form, digital words representing the required voltage for driving a meter to the requisite degree will also be produced. These words will be applied to digital to analog converters and buffers before application to the meter or meters. An exemplary meter drive circuit in accordance with the invention is depicted in FIG. 4.

The analog input and output signals have briefly been described above. As in the case of the digital inputs and outputs, the analog inputs and outputs are selected and conditioned under program control whereby analog input voltages, such as those generated by resistors, are routed through input circuitry and modified and then routed to the microprocessor 40 via the data bus in the form of digital data. The analog output circuits 78 provide the path through which digital words are converted to analog voltages; these words being the result of the solution of simultaneous equations comprising the Boolean model of the equipment being simulated. The analog output voltages are routed to such output devices as simulated gauges and meters. The analog input circuit includes an analog-to-digital converter 58 while the analog output circuit 78 includes a digital-to-analog converter 82. The analog to digital converter 58 conditions an analog input, as delivered to an addressed select and hold circuit, for application to the data bus. Addressed analog output circuits; through the use of an address decoder 79, storage device 80 and drive circuits 81; provide a signal to converter 82 which, in turn, provides an output compatible with the analog output requirements.

As will be obvious from the discussion above, the trainer of the present invention has the capability of providing active and passive simulated gauge or meter outputs. The active simulated gauges or meters will employ moving coil meters which may be driven by the output of a digital-to-analog converter 82 in the analog output circuits 78 or driven by a digital-to-analog converter under direct control of the microprocessor; the active discrete digital meter drive being provided by output circuits 70. The program model which defines the attributes for each meter or gauge is stored in memory 42. Each program model; i.e., the set of equations stored in memory 42; will evaluate all system variables which are pertinent to the associated gauge or meter and will produce a response which, when interpreted by the digital-to-analog converters in output circuits 70 and 78, will cause the meter or gauge to respond realistically. With respect to the passive gauges or meters, a visual display will be provided by a pictorial representation of the activity of the gauge or meter as illuminated or projected on the visual display panel 14. The pictorial representation of a component or meter may be illuminated or projected as the result of the evaluation of equations which include the student input. The "visual" to be selected will be determined by the program model based upon the normal conditions and/or the malfunction condition entered by means of control panel switches 22.

As the lesson progresses the student may make measurements in an effort to isolate the problem inserted by the instructor via switches 22 of control panel 12 and the student will perform such simulated tasks as cleaning, repairing or replacing components of the apparatus which is the lesson subject. When the student performs the required action to correct the instructor inserted fault or malfunction the system will automatically revert to providing a simulated performance which is commensurate with the normal performance of the apparatus which is the lesson subject. Depending on the stored program, the number in display device 28 is updated in response to the output of real time clock 60 subsequent to entry of the malfunction. The updating of the time display will, under program control, automatically be halted when the student solves the problem thus providing an indication of the time required for malfunction correction. The display device 30 will record the number of maintenance actions, including tests and/or component repairs or replacements, taken by the student to solve the problem. The student's performance will be graded as a function of the elapsed time and the number of performed maintenance actions.

When the student has solved a problem the instructor may reset the elapsed time and repair/replace displays, clear the problem if not automatically cleared under program control in response to student selection and enter a new problem into the system via the control panel 12. The instructor's desire to clear the system or enter a new problem is indicated by the state of switch 26 on panel 12; the state of the switch being scanned approximately every 10 miliseconds in accordance with one operative embodiment of the invention.

To describe the control panel 12 in more detail, the instructor's console is enabled by a control console select signal from block select circuit 48. The read address decoder 64 in panel 12 is enabled by the address bus and by "read" commands generated by microprocessor 40. Thus, upon addressing and receipt of a "read" signal, the address is decoded to produce signals which strobe a buffer 83 associated with each of the thumb wheel switches 22 to thereby load into buffer 83 a number commensurate with the position of the switches. Separate lines from decoder 64 define the unique addresses associated with switches 24 and 26 and enable the reading by logic circuit 66 of the problem "clear" and "enter" commands generated by operation of the switches; the signals commensurate with the state of switches 24 and 26 having been conditioned in circuit 62. The state of switches 24 and 26 is applied to the data bus as the most significant bit of information provided by the control console 12.

The displays on the control console are addressed and updated in pairs. The displays are selected by an address decoder 90 which is enabled by the "write" command generated by microprocessor 40 and the aforementioned "control console enable" signal from block select circuit 48. The bits comprising the address are, in addition to being decoded by address decoder 64, decoded by address decoder 90 and employed to enable storage devices 92, 94, 96 and 98. Considering storage devices 96 and 98, which may comprise flip-flops, the most significant bit of input data from panel 12 is delivered to these devices. The flip-flop storage device addressed by the output of decoder 90 is clocked to light or extinguish the "enter" or "clear" lamps 100 and 102 as appropriate based upon the stored program. With respect to the time and action displays 28 and 30, these displays typically comprise buffer storage devices 92 and 94 which drive light emitting diodes. The elapsed time and action displays are, as noted above, updated under control of the program. Thus, the output of real time clock 60 is periodically delivered to microprocessor 40 and, under control of the program stored in memory 42, a number is loaded into the "scratch pad" memory 50 and periodically incremented. This action results in the display device 28 being periodically updated as a function of the program and the output of real time clock 60.

Figure 3:
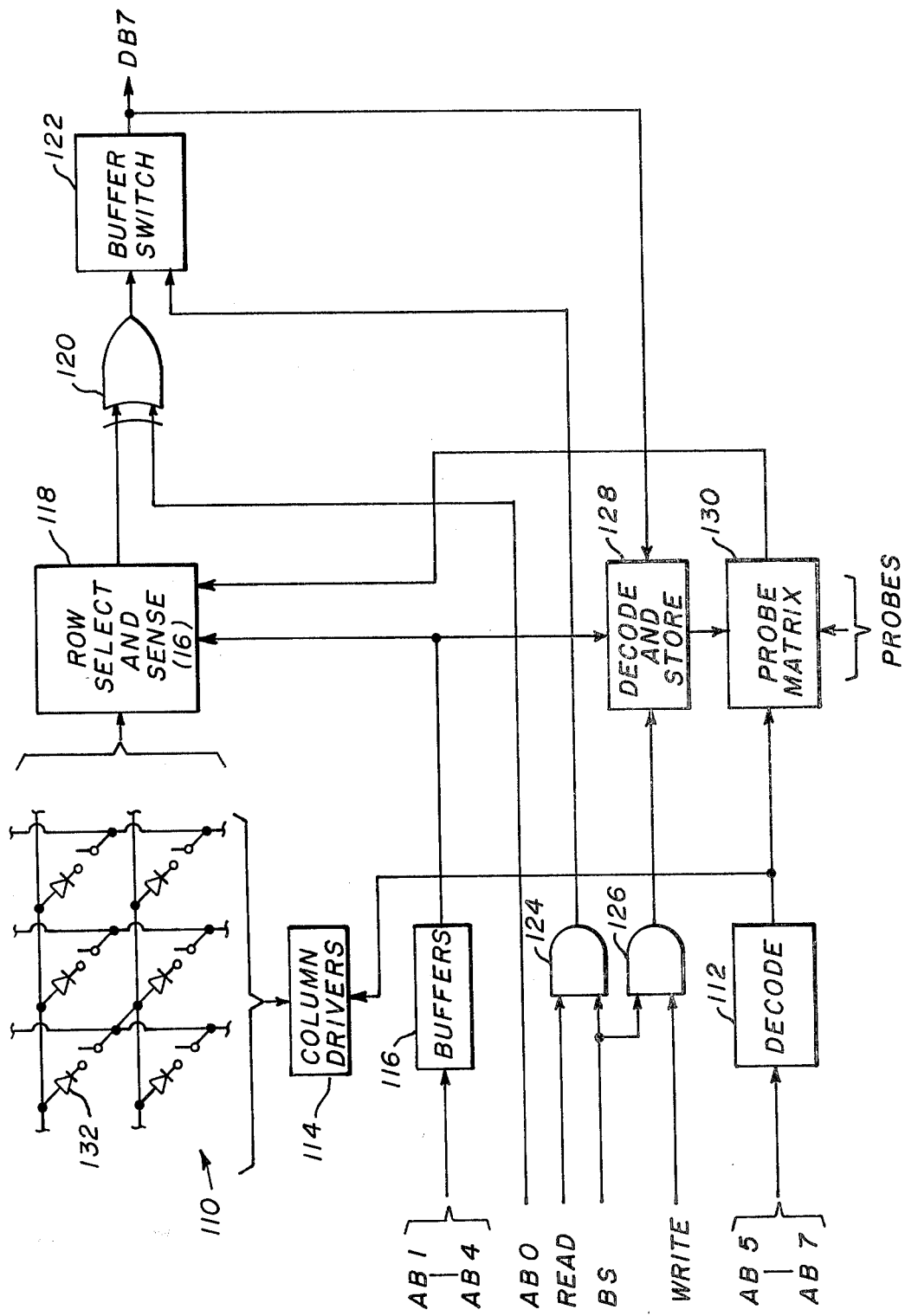
FIG. 3 is a functional block diagram of input circuitry associated with the student operable inputs to the apparatus of FIGS. 1 and 2.

With reference now to FIG. 3, in one reduction to practice of the invention the input circuit for monitoring the discrete digital inputs from student panel 10 consisted of a pair of printed circuit cards. Each card is enabled by a separate block select (BS) enable signal generated by the block select circuit 48. Each card, in the embodiment being described, had the capability of monitoring the condition of one hundred twelve switch elements and sixteen jacks. The determination of whether a pair of switch contacts are open or closed is made by applying a signal to one of the contacts and monitoring the other. Thus, in accordance with the preferred embodiment of the invention as depicted schematically and generally at 110 in FIG. 3, the switch elements are wired in a matrix. To test a pair of switch contacts, a signal is applied to the column line along which the switch is located. The row line on which the switch is located is then read. Considering an 8 ×16 matrix, address bits AB5-AB7 are decoded in a decoder 112. Decoder 112 has eight outputs and one of these output lines will be activated pursuant to the state of the three address bits. The outputs of decoder 112 are applied to column drivers 114 whereby the active line energizes the selected column of the switch matrix. Address bits AB1-AB4 are applied, through conventional buffers 116, to a row select and sense circuit 118. Row select and sense circuit 118, which may comprise a Texas Instruments type 74150 data selector/multiplexer, decodes the four address bits to select one of the sixteen switch matrix rows. Circuit 118 also senses the state of the selected row thereby determining if the selected input switch contact pair is open or closed; information commensurate with the state of the selected switch being stored in an accumulator in microprocessor 40.

The output of row select and sense circuit 118 is applied as a first input to an exclusive OR circuit 120. The least significant address bit, AB0, is also applied to circuit 120 thereby giving the input circuit the capability of providing either the true or complimented term on the data bus indicated at DB7. The state of exclusive OR circuit 120 is coupled to the data bus via a buffer/switch 122. The buffer/switch 122 is a tri-state device such as a Signetics Corporation type 1897 tri-state buffer which presents a high impedance to the DB7 line unless it is addressed in the manner to be described below. Thus, if AB0 is "1" (true), DB7 will correspond to the output of the select and sense circuit 118. However, if AB0 is "0", DB7 is complimented; i.e., the output of exclusive OR circuit 120 will be the compliment of the select and sense circuit output.

Read and write commands generated by microprocessor 40 are respectively applied as first inputs to AND gates 124 and 126. A block select signal from circuit 48 is applied as the second input to each of gates 124 and 126. Thus, upon the generation of a "read" command and an appropriate block select address, the output of gate 124 will enable buffer/switch 122 and the results of the scanning of the student input switch matrix will be applied to the data bus.

The switch matrix 110 also includes a plurality of isolation diodes as indicated at 132. The isolation diodes prevent any ambiguity should be student's action result in the simultaneous closing of more than one switch connected to a single row of the matrix. The isolation diodes are connected in series with the switches which are activated from the student panel, via the buttons 17, and the number of diodes per row will be commensurate with the number of columns; i.e., there will be an isolation diode in series with each switch. If two switches connected to a single column are simultaneously closed, current will be unable to flow from row to row because of the back-to-back relationship of the diodes. There is no need to provide similar protection on a column to column basis since the rows are scanned singly under the program control.

Student panel 10 also has the capability of permitting the student to make test measurements. Thus, in order to determine if a meter probe is connected to a test jack, a signal is applied to the probe and the jack is monitored. The "write" command, upon enabling of gate 126 by the block select signal, is employed to enable the decoding of address bits AB1-AB4 in a decode and store circuit 128. The output of decode and store circuit 128 is applied to a probe matrix 130 to select a panel jack. The output of decoder 112, commensurate with decoded address bits AB5-AB7, is also applied to probe matrix 130 to activate probe lines. It is to be noted that more than one probe line can be activated at one time. With the probe line or lines activated, the state of the panel jacks is sensed and, via row select and sense circuit 118, data bit DB7 may be conditioned to reflect the state of the jack. As in the case of the output derived from the scanning of the switch matrix, the true or complimented state of the sensed panel jack may be applied to DB7.

The output circuits, with the exception of the meter drive logic, have been described above. Referring to FIG. 4, the meter drive circuit which has been shown has the capability of storing four eight-bit words thus enabling the driving of up to four meters; this capability being afforded by a storage device 140 which may take the form of a pair of 4×4 register files such as Texas Instruments type 74170. Address bits AB0 and AB1 are decoded, in an input decoder of storage device 140, to identify the word associated with the meter into which the content of the data buses is to be loaded. Thus, the data bits which appear on DB0-DB7 are stored in the appropriate eight-bit register of storage device 140 as a function of address bits AB0 and AB1. It is to be noted that the storage of data in the registers comprising storage device 140 does not produce an output from the storage device and that this device functions only when enabled, in the manner to be described below, by a "store number" signal from a decoder 152.

The meter drive circuit also includes a clock 142 which delivers pulses to a two-bit binary counter 144. The two output lines from counter 144 are employed to sequentially read out each of the four registers of storage device 140; the counter output lines being first decoded by an output decoder in storage device 140. The eight data bits from the storage register of storage device 140 selected by the output of counter 144 are applied to a digital-to-analog converter 146. Digital-to-analog converter 146, in turn, applies an analog voltage to the input of four analog control switches 148.

The output bits from counter 144 are also applied to a decoder 150 which serially activates the control lines for the four analog switches 148. The analog switches are thereby enabled in synchronism with the read out of the four eight-bit data registers in storage device 140. The meter or meters 152 are thus driven by the appropriate set of data. A potentiometer in series with each of the meters may be adjusted to obtain correct full scale deflection. It is also to be noted that the meter or meters are pulsed, as a result of the output of clock 142, at a different rate than the rate of data update of the storage registers of storage device 140. This pulse rate will be sufficiently high so as to provide substantially constant meter readings.

The meter peg function is enabled by address bit AB2 and the "write" command; the AB2 line and the "write" command being delivered to a dual two of four decoder 152 which may, for example, be a Fairchild Electronics type 9321 decoder. Decoder 152, in response to the state of address bit AB2 and when enabled by a block select signal, will provide either a "store number" enable signal for application to storage device 140 or a "store peg" enable signal for application to a "store peg" control circuit 154. Data bits DB0-DB3 are respectively delivered to four 4-bit registers in the "store peg" control circuit 154 and activate one of the four output lines thereof which, in turn, are applied to respective meter drive amplifiers such as amplifier 156. The gating of an amplifier associated with one of the meters by an output from the "store peg" circuit 154 will result in the associated meter being "pegged".

While a preferred embodiment has been shown and described, various modifications and substitutions may be made thereto without departing from the spirit and scope of the invention. Accordingly, it will be understood that the present invention has been described by way of illustration and not limitation.

What is claimed is:

1. A trainer comprising:

display means, said display means including student display-reaction panel means, said panel pictorially depicting a lesson subject to be simulated by the trainer pursuant to a stored program, said panel means comprising a plurality of student operable switches individually associated with constituent parts of the subject of the simulated lesson, each of said student operable switches having a first contact and a second contact;

means connecting said display means panel means switches in a matrix with a first contact of each switch being coupled to a row in the matrix and a second contact of the switch being coupled to a column in the matrix whereby the state of the switches may be sensed by activating columns and monitoring rows of the matrix under control of the program;

output means, said output means being at least in part associated with said display means panel means and including a plurality of digitally coded signal response display means which generate visually observable representations of the simulated lesson subject;

control means, said control means selectively generating digitally coded output signals commensurate with desired modifications of the simulated lesson subject, the modifications being included in the program;

a data processor, said data processor including a timing signal generator which controls the cycling of said processor;

non-volatile storage means, said non-volatile storage means containing at least a portion of the program which controls the operation of said data processor;

random access memory means for storing intermediate results of operations for analysis by said data processor;

a common data bus interconnecting said data processor, storage means, memory means, control means, switch matrix and output means whereby signals commensurate with simulation modifications may be delivered to said memory means and the results of calculations performed by said data processor in response to the instructions comprising the stored program and pursuant to the state of the display means panel means switches and control means output signal will be delivered as input information to said output means;

a common address bus interconnecting said data processor, storage means, memory means, control means, switch matrix and output means whereby said switch matrix and said storage, memory, control and output means may be addressed by said data processor in accordance with the stored program; and block select signal generating means, said block select signal generating means being connected to said address bus and comprising a memory device with a fixed program, said block select signal generating means individually and selectively providing enabling signals to said storage means, memory means, output means and means connecting said display means panel means switches in a matrix.

2. The apparatus of claim 1 wherein said data processor comprises:
a microprocessor; and
a clock pulse generator.

3. The apparatus of claim 2 wherein said non-volatile storage means comprises:
a read only memory.

4. The apparatus of claim 3 further comprising:
clock means, said clock means being connected to said common data and address buses and generating timing signals, said timing signals being delivered to said memory means under control of the stored program whereby said output means may be caused to simulate dynamic conditions as the output of said clock means as stored in said memory means under control of the stored program is updated.

5. The apparatus of claim 1 wherein said non-volatile storage means comprises:
a read only memory.

6. The apparatus of claim 5 further comprising:
clock means, said clock means being connected to said common data and address buses and generating timing signals, said timing signals being delivered to said memory means under control of the stored program whereby said output means may be caused to simulate dynamic conditions as the output of said clock means as stored in said memory means under control of the stored program is updated.

7. The apparatus of claim 1 further comprising:
clock means, said clock means being connected to said common data and address buses and generating timing signals, said timing signals being delivered to said memory means under control of the stored program whereby said output means may be caused to simulate dynamic conditions as the output of said clock means as stored in said memory means under control of the stored program is updated.

8. The apparatus of claim 2 further comprising:
clock means, said clock means being connected to said common data and address buses and generating timing signals, said timing signals being delivered to said memory means under control of the stored program whereby said output means may be caused to simulate dynamic conditions as the output of said clock means as stored in said memory means under control of the stored program is updated.

9. A trainer comprising:

display means, said display means including student display-reaction panel means, said panel means pictorially depicting a lesson subject to be simulated by the trainer pursuant to a stored program, said panel means comprising a plurality of student operable switches individually associated with constituent parts of the subject of the simulated lesson, each of said student operable switches having a first contact and a second contact;

output means, said output means being at least in part associated with said display means panel means and including a plurality of digitally coded signal responsive display means which generate visually observable representations of the simulated lesson subject;

control means, said control means selectively generating digitally coded output signals commensurate with desired modifications of the simulated lesson subject, the modifications being included in the program;

a data processor, said data processor including a timing signal generator which controls the cycling of said processor;

non-volatile storage means, said non-volatile storage means containing at least a portion of the program which controls the operation of said data processor;

random access memory means for storing intermediate results of operations for analysis by said data processor;

a plurality of column conductors, first contacts at each of said panel means switches being connected to individual of said column conductors;

a plurality of row conductors, second contacts of each of said panel means switches being connected to individual of said row conductors whereby said display means panel means switches are connected in a matrix;

first address decoder means, said first decoder means individually providing a plurality of output signals commensurate in number with the number of columns in the switch matrix;

means delivering said first decoder means output signals to said column conductors whereby said column conductors are energized in accordance with the stored program;

second address decoder means, said second decoder means having a plurality of sensing inputs commensurate in number with said row conductors;

means connecting said second decoder means sensing inputs to said row conductors whereby said row conductors are sensed in accordance with the stored program;

means connected to said second decoder means for generating signals commensurate with the state of each of said switches in accordance with the individual energization of the column conductors and the sensing of the row conductors;

a common address bus interconnecting said data processor, storage means, memory means, control means, output means and first and second address decoder means whereby the switch matrix and said storage, memory, control and output means may be addressed by said data processor in accordance with the stored program; and a common data bus interconnecting said data processor, storage means, memory means, control means, output means and means for generating signals commensurate with the state of said panel means switches whereby signals commensurate with simulation modifications may be delivered to said memory means and the results of calculations performed by said data processor in response to the instructions comprising the stored program and pursuant to the state of the display means panel means switches and control means output signals will be delivered as input information to said output means.

10. The apparatus of claim 9 further comprising:
block select signal generating means, said block select signal generating means being connected to said address bus and comprising a memory device with a fixed program, said block select signal generating means individually and selectively providing enabling signals to said storage means, memory means, output means and means connecting said second decoder means sensing inputs to said row conductors.

11. The apparatus of claim 9 wherein said means generating signals commensurate with the state of said switches comprises:
logic circuit means connected to said second decoder means and to said address bus for providing, under control of the stored program, a signal for delivery to the data bus commensurate with the true or complimented state of each of said switches.

12. The apparatus of claim 9 further comprising:
isolation diodes connected in series with each of said switches between a column conductor and a row conductor.

13. The apparatus of claim 9 wherein said data processor comprises:
a microprocessor; and
a clock pulse generator.

14. The apparatus of claim 13 further comprising:
block select signal generating means, said block select signal generating means being connected to said address bus and comprising a memory device with a fixed program, said block select signal generating means individually and selectively providing enabling signals to said storage means, memory means, output means and means connecting said second decoder means sensing inputs to said row conductors.

15. The apparatus of claim 14 wherein said non-volatile storage means comprises:
a read only memory.

16. The apparatus of claim 13 further comprising:
block selected signal generating means, said block select signal generating means being connected to said address bus and comprising a memory device with a fixed program, said block select signal generating means individually and selectively providing enabling signals to said storage means, memory means, output means and means connecting said second decoder means sensing inputs to said row conductors.

17. The apparatus of claim 16 further comprising:
isolation diodes connected in series with each of said switches between a column conductor and a row conductor.

18. The apparatus of claim 17 wherein said means generating signals commensurate with the state of said switches comprises:
logic circuit means connected to said second decoder means and to said address bus for providing, under control of the stored program, a signal for delivery to the data bus commensurate with the true or complimented state of each of said switches.

19. The apparatus of claim 18 further comprising:
clock means, said clock means being connected to said common data and address buses and generating timing signals, said timing signals being delivered to said memory means under control of the stored program whereby said output means may be caused to simulate dynamic conditions as the output of said clock means as stored in said memory means under control of the stored program is updated.

20. The apparatus of claim 19 wherein said non-volatile storage means comprises:
a read only memory.

21. The apparatus of claim 9 wherein said means for generating signals commensurate with the state of said switches comprises:
logic circuit means connected to said second decoder means and to said address bus for providing under control of the stored program, a signal for delivery to the data bus commensurate with the true or complimented state of each of said switches.

22. The apparatus of claim 21 further comprising:
isolation diodes connected in series with each of said panel means switches between one of said column conductors and one of said row conductors.

23. The apparatus of claim 9 further comprising:
isolation diodes connected in series with each of said panel means switches between one of said column conductors and one of said row conductors.

* * * * *